US006992968B2

(12) United States Patent
Ueyanagi (10) Patent No.: US 6,992,968 B2
(45) Date of Patent: Jan. 31, 2006

(54) OPTICAL HEAD AND DISK UNIT

(75) Inventor: Kiichi Ueyanagi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 487 days.

(21) Appl. No.: 10/237,865

(22) Filed: Sep. 10, 2002

(65) Prior Publication Data

US 2003/0072245 A1   Apr. 17, 2003

(30) Foreign Application Priority Data

Oct. 16, 2001 (JP) .............................. 2001-318447

(51) Int. Cl.
*G11B 7/135* (2006.01)
(52) U.S. Cl. .............................. 369/112.24; 369/13.33; 369/300
(58) Field of Classification Search ............. 369/13.33, 369/112.24, 300, 13.02, 44.17
See application file for complete search history.

(56) References Cited

U.S. PATENT DOCUMENTS

| | | | | |
|---|---|---|---|---|
| 5,982,716 | A | * | 11/1999 | Kino et al. .................... 369/14 |
| 6,154,326 | A | * | 11/2000 | Ueyanagi et al. ............ 359/819 |
| 6,320,841 | B1 | * | 11/2001 | Watanabe et al. ............ 369/300 |
| 6,434,105 | B1 | * | 8/2002 | Kobayashi .............. 369/112.28 |
| 6,703,595 | B2 | * | 3/2004 | Tadaki ...................... 250/201.5 |
| 6,710,919 | B1 | * | 3/2004 | Clausen ....................... 359/453 |

FOREIGN PATENT DOCUMENTS

JP     A 9-251662     9/1997

OTHER PUBLICATIONS

Terris et al., "Near-field optical data storage using a solid immersion lens", Appl. Phys. Lett., vol. 65, No. 4, pp. 388-390, 1994.
Osato et al., "Progress in Optical Disk Recording with over 20 GB of Capacity", IEEE, pp. 15-17, 2000.
Otaki, "Simulation of Readout Signals with Near Field SIL", The Intstitute of Electronics, Information and Communication Engineers, pp. 31-36, 1998.
Road Map in information recording field by Optoelectronic Industry and Technology Development Association, 1998.
Kittaka et al., "Near-Field Objective With Radial Grin Rodlens", International Symposium on Optical Memory, 2000.

* cited by examiner

*Primary Examiner*—William Korzuch
*Assistant Examiner*—Van T. Pham
(74) *Attorney, Agent, or Firm*—Oliff & Berridge, PLC (57) ABSTRACT

An optical head and a disk unit are provided, in which the height and the weight of the optical head are reduced to enable a disk unit of small size and high recording density. The optical head has 2-group lenses containing a first lens arranged on a side of a semiconductor laser and a second lens arranged to face a recording layer of an optical disk, and an optical axis of the objective lens is arranged in parallel to the recording layer. The optical head can be reduced in height and the weight according to the constitution.

43 Claims, 10 Drawing Sheets

OPTICAL HEAD AND DISK UNIT

BACKGROUND OF THE INVENTION

1. Field of the Invention

The present invention relates to an optical head and a disk unit, and more particularly, it relates to an optical head and a disk unit that attain an optical head having a small thickness and a light weight to enable a disk unit, such as an optical disk, a magnetic disk and a magneto-optical disk, realizing a small size and a high recording density.

2. Description of the Related Art

Optical disks including magneto-optical disks are demanded to have a high density and a large capacity. According to the road map organized by Optoelectronic Industry and Technology Development Association (Japan), it is requested that the recording density attains 1 Tbits/(inch)$^2$ in 2010 (Road Map in information recording field by Optoelectronic Industry and Technology Development Association (Japan), March of 1998).

As a major candidate therefor, magneto-optical recording using near-field light from a solid immersion lens (SIL) can be exemplified. In this technique, recording is carried out by using near-field light (or evanescent light) leaked from a light spot on a light converging surface of an SIL having a semispherical shape or a super semispherical shape (B. D. Terris, et al., Appl. Phys. Lett., vol. 65(4), p. 388 (1994)).

In this recording technique, the distance between the SIL and the recording surface is necessarily 100 nm or less as calculated by K. Otaki (K. Otaki, Technical Research Report of Institute of Electronics, Information and Communication Engineers, CPM98–110, p. 30 (1998)), and it is necessary that the optical head is run in a flying state at an altitude around 100 nm or less. Accordingly, the disk is necessarily of a non-removable type to avoid invasion of dusts, and therefore, it is necessary that the height of the optical head is as low as that that of a magnetic head used in a fixed magnetic disk unit. Magnetic heads having a height of about 0.5 mm or less (pico heads) are being brought into the market as the most advanced products. Particularly, in the case of a so-called Winchester type disk unit having plural disks stacked, reduction of the distances between the disks is important for increasing the volume density, and there arises a demand for reduction of the height of the head inserted between the disks. In the case of a removable disk, the size reduction and the weight reduction of an optical head are important for such an operation as high-speed tracking and high speed seeking.

Examples of the conventional optical head using an SIL include those disclosed in B. D. Terris, et al., Appl. Phys. Lett., vol. 65(4), p. 388 (1994).

Figure 12:
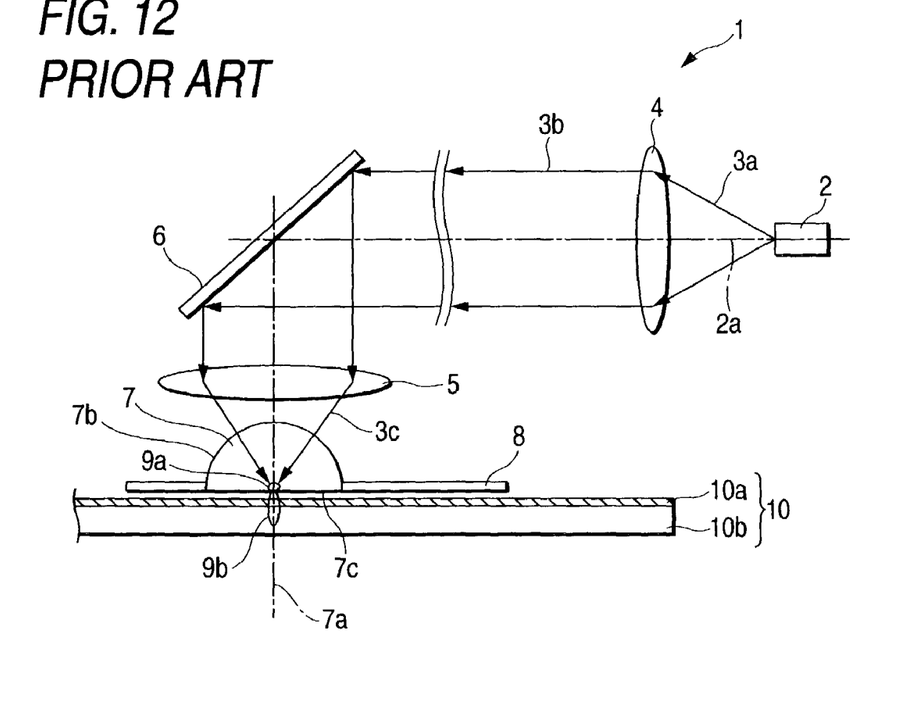
FIG. 12 is a lateral cross sectional view showing the conventional optical head.

FIG. 12 is a lateral cross sectional view showing the conventional optical head. The optical head 1 has a semiconductor laser 2 emitting a laser beam 3a, a collimator lens 4 shaping the output beam 3a from the semiconductor laser 2 into a parallel beam 3b, a folding mirror 6 reflecting the parallel beam 3b from the collimator lens 4 at a substantially right angle, an objective lens 5 converging the parallel beam 3b reflected by the folding mirror 6, an SIL 7 forming a light spot 9a on a light converging surface 7c with a focused beam 3c incident from the objective lens 5, and a flying slider 8 running in a flying state and supporting at least the semiconductor laser 2, the collimator lens 4, the folding mirror 6, the objective lens 5 and the SIL 7.

In the optical head 1, the semiconductor laser 2 is arranged to make the optical axis 2a of the emitted laser beam 3a parallel to the optical disk 10, and the laser beam 3a is collimated with the collimator lens 4 to form the parallel beam 3b, which is then perpendicularly reflected with the folding mirror 6 to make incident on the objective lens 5. Therefore, the height of the optical head can be decreased in comparison to such a constitution that the semiconductor laser 2 as a light source is arranged on the optical axis 7a of the SIL 7.

Instead of the recording method using the near-field light by an SIL, on the other hand, there have been investigations for increasing recording density in the well-known optical recording method by irradiating an optical recording medium with a minute light spot.

As major features of optical disks, it is a removable medium, and a distributable ROM can be provided thereby. After the development of a DVD (digital versatile disk), a so-called DVR (digital video recorder) using an objective lens having an aperture of 0.85, for example, is developed to aim further high density recording, and in the case where a blue laser is used, a recording density of 20 GB (per disk of 12 cm in diameter) has been attained (Tech. Dig. of Optical Data Storage 2000, MB1, p. 15 (2000)).

As an example of the conventional optical head used for the DVR technique, an optical head disclosed in JP-A9-251662 can be exemplified.

The optical head has a light source generating a light wave, 2-group lenses formed with an objective lens for converging the light from the light source and a field lens arranged on the same axis as the optical axis of the objective lens, and a motor for moving the objective lens with respect to the objective lens in the direction along the optical axis. The aperture can be 0.85 by using the 2-group lenses, and a minute light spot can be formed. The spherical aberration can be relieved by changing the distance between the objective lens and the field lens.

However, the optical head using an SIL has such a problem that the height of the optical head is large because the objective lens 5 and the folding mirror 6 are arranged above the SIL 7.

As shown in FIG. 12, the optical axis of the objective lens 5 is conformed to the optical axis 7a of the SIL 7, and the optical axis 7a of the SIL 7 is arranged perpendicular to the optical disk 10. The configuration is customarily employed because the optical axis of the objective lens has been arranged perpendicularly to the surface of the optical disk in the conventional optical disk units, and the objective lens has been arranged perpendicularly to a sample in an oil immersion microscope (oil immersion lens), which is an origin of SIL.

The size of SIL itself has been decreased in recent years, and those having a size of 0.2 mm or less are being produced (S. Kittaka and Y. Sakai, Digest of Int. Symp. on Optical Memory 2000, Fr-J-15, p. 136 (2000)). However, the size of the objective lens is difficult to decreased to 1 mm or less, and therefore, the diameter of the laser beam is also of the similar size. Accordingly, the height of the optical head becomes 2 mm or more, which brings about a considerably large height of the head in comparison to the magnetic heads. Consequently, even when the surface recording density of the disk is increased to the similar level as the magnetic disks, the volume recording density is considerably lower than the magnetic disk units.

The similar problem occurs in the case of the optical system where a light spot is formed on the optical medium with the 2-group lenses.

SUMMARY OF THE INVENTION

The invention is to provide an optical head and a disk unit that attain an optical head having a small height to enable a disk unit to realize a high recording density and a large capacity.

The invention provides an optical head containing a laser light emitting optical element for emitting laser light; an optical system for converging the incident laser light, the optical system containing a first lens for converging the laser light with an optical axis of the first lens being arranged in parallel to a recording layer, and a second lens, to which the laser light converged by the first lens is incident, facing a recording medium with an optical axis of the second lens being arranged in substantially perpendicular to the recording layer to further converge the laser light converged by the first lens; and a reflector positioned between the first lens and the second lens, the reflector reflecting the laser light passing through the first lens to be incident on the second lens.

The invention also provides an optical head forming a light spot on an emission surface of a solid immersion lens or a vicinity thereof by converging laser light emitted from a semiconductor laser with a light converging optical system containing an objective lens, an optical axis of the objective lens being arranged in perpendicular to an optical axis of the solid immersion lens.

According to the configuration, the height of the optical head can be reduced to such a level that is equivalent to the diameter of the objective lens, and therefore, the height thereof can be considerably reduced in comparison to the conventional optical heads.

The invention also provides, as still another aspect, an optical head forming a light spot on an emission surface of a solid immersion lens or a vicinity thereof by converging laser light emitted from a semiconductor laser with a light converging optical system containing an objective lens, an optical axis of the objective lens being arranged in perpendicular to an optical axis of the solid immersion lens, and the optical head containing a scanning unit for scanning the light spot in a direction perpendicular to the optical axis of the objective lens and the optical axis of the solid immersion lens.

The invention also provides, as a further aspect, a disk unit containing an optical head forming a light spot on an emission surface of a solid immersion lens or a vicinity thereof by converging laser light emitted from a semiconductor laser with a light converging optical system containing an objective lens, a rotating information recording disk, a running unit for running the optical head in a flying state above the information recording disk, and a reproducing unit for reproducing information signals from the information recording disk by irradiating the information recording disk with the light spot, an optical axis of the objective lens being arranged in perpendicular to an optical axis of the solid immersion lens.

The invention also provides, a still further aspect, an optical head containing a laser light emitting optical element for emitting laser light, 2-group lenses containing a first lens arranged on a side of the laser light emitting optical element and a second lens arranged to face a recording layer, the 2-group lenses for converging the laser light emitted from the laser light emitting optical element, a photodetector for detecting reflected light from the recording layer, and a moving unit for moving a converging point of the laser light on the recording layer, an optical axis of the first lens being arranged in substantially parallel to the recording layer, and the laser light emitted from the laser light emitting optical element being reflected by a reflector to be incident on the second lens.

According to the configuration, the optical axis of the first lens positioned on the side of the laser light emitting optical element of the 2-group lenses is arranged in substantially parallel to the recording layer, and therefore, the height of the optical head is reduced to enable weight saving.

The invention also provides, a still further aspect, a disk unit reproducing information from a rotating disk by emitting laser light from an optical head to be incident on the disk having a recording layer having the information recorded therein, the optical head containing a laser light emitting optical element for emitting laser light, 2-group lenses containing a first lens arranged on a side of the laser light emitting optical element and a second lens arranged to face a recording layer, the 2-group lenses for converging the laser light emitted from the laser light emitting optical element, and a photodetector for detecting reflected light from the recording layer, an optical axis of the first lens being arranged in substantially parallel to the recording layer, and the laser light emitted from the laser light emitting optical element being reflected by a reflector to be incident on the second lens.

According to the configuration, high-speed tracking is realized owing to the use of the thin and lightweight optical head to increase the transfer rate.

BRIEF DESCRIPTION OF THE DRAWINGS

Preferred embodiments of the invention will be described in detail based on the following figures wherein:

FIGS. 7A and 7B are diagrams showing an important part of an optical head according to a sixth embodiment of the invention, in which

DESCRIPTION OF THE PREFERRED EMBODIMENTS

Figure 1A:
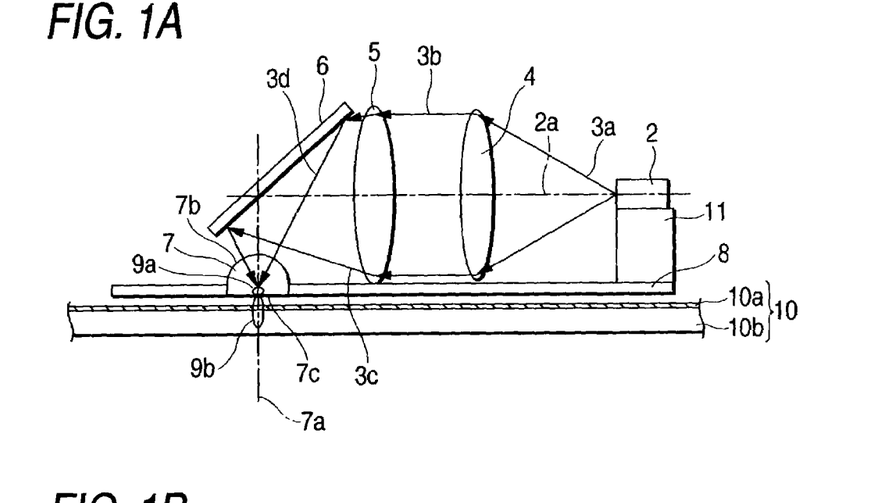
FIG. 1A is a lateral cross sectional view showing an optical head according to a first embodiment of the invention.

FIG. 1A shows an important part of a recording system of an optical head according to the first embodiment of the invention. The optical head 1 has a semiconductor laser 2 for emitting a laser beam 3a, a pedestal 11 that also functions as a heat sink of the semiconductor laser 2, a collimator lens 4 shaping the output beam 3a from the semiconductor laser 2 into a parallel beam 3b, an objective lens 5 for converging the parallel beam 3b from the collimator lens 4, a folding mirror 6 for reflecting the converging beam 3c from the objective lens 5 at a substantially right angle, an SIL 7, on which the converging beam 3d reflected by the folding mirror 6 is incident, and a flying slider 8 for supporting at least the objective lens 5, the folding mirror 6, and the SIL 7 and running in a flying state above an optical disk 10.

The SIL 7 is formed with a part of spherical surface and has a semispherical form constituted from an incident surface 7b having a half spherical surface form, on which the converging beam 3d is incident without refraction, and a light converging surface 7c constituted with a plane surface including the center of the spherical surface and functioning as an emitting surface, on which a light spot 9a is formed by converging the converging beam 3d. The position where the light spot 9a is formed may be a vicinity of the emitting surface.

An optical axis 5a of the objective lens 5a is conformed to an optical axis 2a of the semiconductor laser 2 and is substantially perpendicular to an optical axis 7a of the SIL 7.

According to the first embodiment, the optical axis 5a of the objective lens 5 is conformed to the optical axis 2a of the semiconductor laser 2 and is substantially perpendicular to the optical axis 7a of the SIL 7, and therefore, the height of the optical head 1 is equivalent to the sum of the diameter of the objective lens 5 and the thickness of the flying slider 8, whereby the height can be considerably reduced in comparison to the conventional optical head shown in FIG. 7. Specifically, assuming that the diameter of the objective lens 5 is 1 mm, and the thickness of the flying slider 8 is 0.1 mm, the height of the optical head 1 can be about 1.1 mm, which is about ½ of the conventional product. The diameter of the objective lens 5 is determined only by the processing technique but is not a matter of optical design, and therefore, the height of the optical head can be further reduced accompanying with progress of the processing technique.

The radius of the SIL 7 is, for example, 0.08 mm. According to the configuration, the incident angle of the converging light incident on the SIL 7 can be 40° or more, and thus the numerical aperture NAi in the SIL 7 is about 0.7. The diameter $D_{1/2}$ of the light spot 9a (i.e., the diameter at the position where the light intensity becomes ½) can be given by the following equation.

$$D_{1/2}=k \cdot \lambda/(n \cdot NAi)$$

In the equation, k represents a proportionality constant, which is about 0.5 in the case of the Gaussian beam, λ represents the wavelength of the incident laser light, n represents the refractive index of the SIL 7, and NAi represents the numerical aperture in the SIL 7, which is equal to the numerical aperture (NA) of the objective lens 5 because no refraction occurs on the incident surface 7b in this embodiment. In the case where dense flint glass (refractive index: 1.9) is used as a material for the SIL 7, and a GaAlInP red laser (wavelength: 630 nm) is used as the semiconductor laser 2, the spot diameter $D_{1/2}$ obtained is about 0.2 μm. Upon recording, a recording film 10a formed on a substrate 10b of the optical disk 10 is approached to the light converging surface 7c with a distance of a third to fifth part of the wavelength, whereby the near-field light spot (9b) is substantially not broadened. Therefore, the size of the minimum recording mark formed on the recording film 10a is equivalent to $D_{1/2}$. Crystalline materials can also be used as the material for the SIL 7, and for example, a further minute spot can be obtained by using GaP (refractive index: 3.3). The objective lens 5 and the collimator lens 4 may be formed as a unit. According to the configuration, the size of the optical head can be reduced, and the assembling accuracy can be improved, whereby the assembling cost can be reduced.

The semiconductor laser for emitting the laser light is integrated on the flying slider, whereby a mechanical servo system for automatic focusing can be omitted to realize small size and lightweight.

Figure 1B:
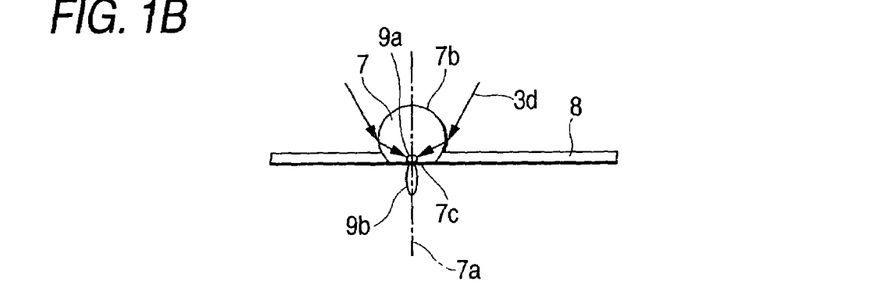
FIGS. 1B to 1G are diagrams showing other embodiments of the invention.

FIG. 1B shows another example of the SIL 7. A super semispherical solid immersion lens (S-SIL) 7 shown in FIG. 1B may be used instead of the semispherical SIL 7 shown in FIG. 1A. The S-SIL 7 has a super semispherical form constituted from an incident surface 7b formed with a part of a spherical surface, and a light converging surface 7c formed with a plane surface that is perpendicular to the light axis 7a of the incident surface 7b and is arranged at a position remote from the center of the spherical surface to the side opposite to the incident surface 7b to a prescribed distance, for example, r/n (wherein r represents the radius, and n represents the refractive index of the medium). The converging light 3d is incident on the incident surface 7b with refraction, and thus the numerical aperture NAi in the S-SIL 7 can be increased n times (n: refractive index) based on the Snell's law, whereby the further minute light spot 9a can be formed. Even when the NA of the objective lens therefor is set at a value as small as 0.45, the numerical aperture NAi in the S-SIL 7 can be increased to 0.9, which is the limit of S-SIL, by using dense flint glass having a refractive index of about 1.91, and the NA of the objective lens 5 can be reduced. Therefore, degree of freedom upon designing is increased, and the diameter of the objective lens 5 can be reduced.

FIGS. 1C, 1D, 1E, 1F and 1E show other examples of the optical head. One or two or more of metallic light scattering members 12 formed with a metal, such as Ag, may be arranged in a vicinity of the light spot 9a formed on the light converging surface 7c of the SIL 7 as shown in FIGS. 1C, 1D, 1E, 1F and 1G.

Figure 1C:
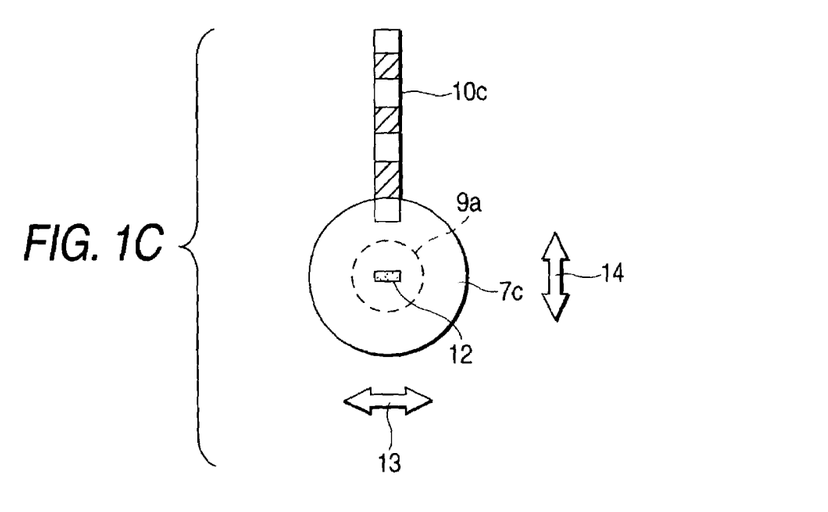

The metallic light scattering member 12 shown in FIG. 1C has a rectangular form, and the longitudinal direction 13 thereof is arranged in a direction intersecting a recording track 10c, whereas the polarizing direction 14 of the incident light 3d is arranged in a direction perpendicular to the longitudinal direction 13. According to the arrangement, plasmon is excited by the metallic light scattering member 12 to increase the intensity of the scattered laser light in a large extent, and thus high-speed recording and reproduction are enabled. While an Ag film is used as the metallic light scattering member 12 herein, it is not limited thereto, but a metallic film, such as Al, Au, Ti, Mo and W, can be used. The thickness of the metallic light scattering member 12 may be about 100 nm or less. The light converging surface 7c around it may be further covered with a thin metallic film. According to the configuration, near-field light generated by plasmon excited by the metallic film can be scattered by the metallic light scattering member 12, whereby the utilization efficiency of light can be further improved.

Figure 1D:
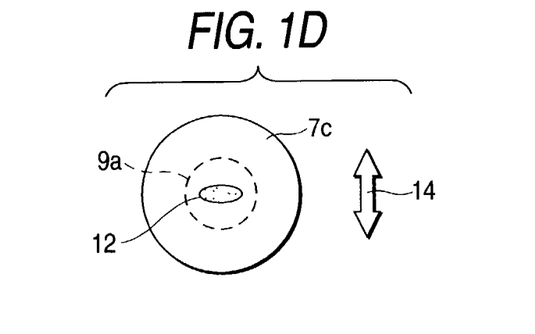

FIG. 1D shows still another example of the metallic light scattering member 12. The metallic light scattering member 12 has an ellipsoidal form having a minor diameter, which is ⅓ of a major diameter. According to the configuration, the efficiency of plasmon excitation can be further improved.

Figure 1E:
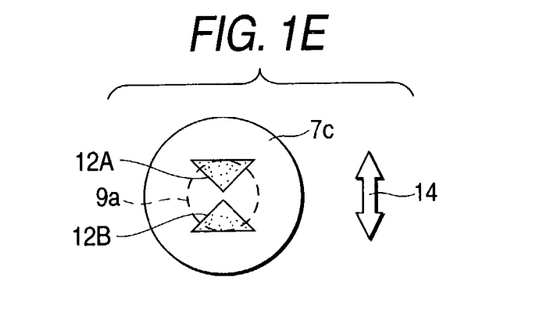

FIG. 1E shows a further example of the metallic light scattering member 12. The metallic light scattering member is formed with two triangular metallic light scattering members 12A and 12B with the apexes thereof being approached to each other. In the case where the pair of the metallic light scattering members 12A and 12B are arranged in the polarizing direction 14 of the converging light 3d for irradiating the metallic light scattering members 12A and 12B, the phases of the plasmon excited by the respective metallic light scattering members 12A and 12B are opposite to each other, and the members function as a dipole antenna, whereby the generation efficiency of the near-field can be further improved. The metallic light scattering member 12B may be replaced with a rectangular member. In this case, the plasmon could be concentrated more efficiently.

Figure 1F:
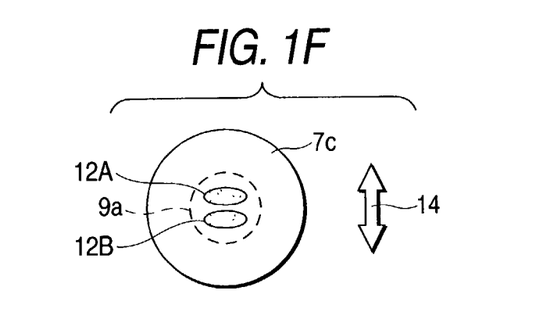

FIG. 1F shows another example of the metallic light scattering members 12A and 12B shown in FIG. 1E. The metallic light scattering members 12A and 12B each may have an ellipsoidal form having a minor diameter, which is ⅓ of a major diameter. According to the configuration, the efficiency of plasmon excitation can be further improved.

Figure 1G:
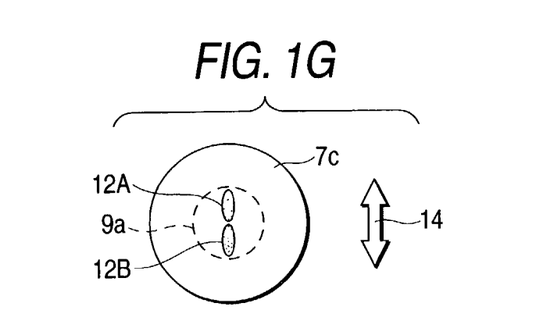

FIG. 1G shows another example of the metallic light scattering members 12A and 12B shown in FIG. 1F. The ellipsoidal metallic light scattering members 12A and 12B are arranged with the tip ends of the minor diameter being faced to each other in the example shown in FIG. 1F, but as shown in FIG. 1G, they may be arranged with the tip ends of the major diameter being faced to each other. According to the configuration, the width of the near-field light can be reduced.

A light shielding member having an aperture or a slit may be arranged on the light converging surface 7c of the SIL 7 or a vicinity thereof. According to the configuration, the emitting light from SIL 7 can be thinned to realize high speed and high density recording.

Figure 2:
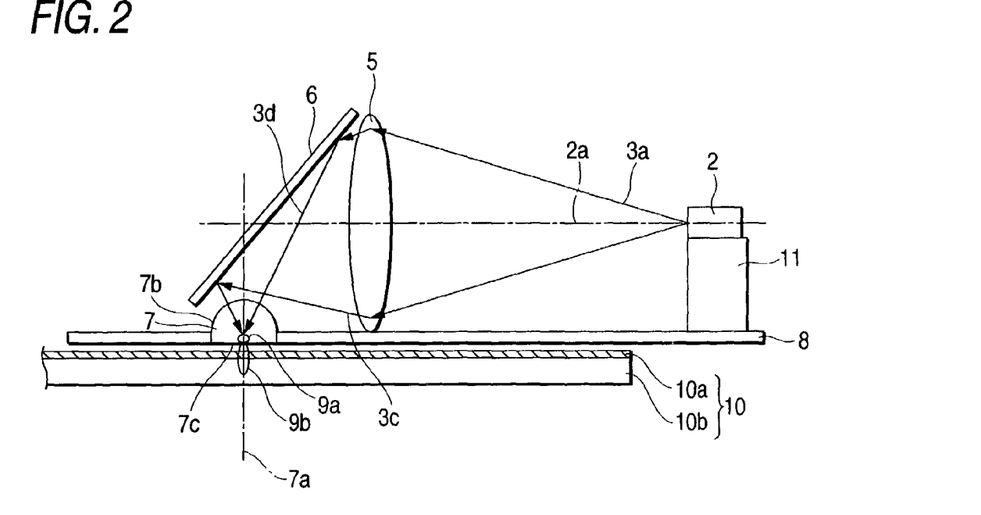
FIG. 2 is a lateral cross sectional view showing an optical head according to a second embodiment of the invention.

FIG. 2 shows an important part of a recording system of an optical head according to the second embodiment of the invention. The optical head according to the second embodiment is obtained by omitting the collimator lens 4 from the first embodiment. According to the embodiment, the number of parts contained in the optical system can be reduced to enable lightweight and low cost. In this case, in order to prevent reduction of the NA on the converging side of the objective lens 5, the broadening angle of the beam emitted from the semiconductor laser 2 cannot be so large. Therefore, a vertical radiation laser (VCSEL) exhibiting a small beam broadening angle of about 8° is preferably used, and an S-SIL is suitable as the solid immersion lens.

Figure 3:
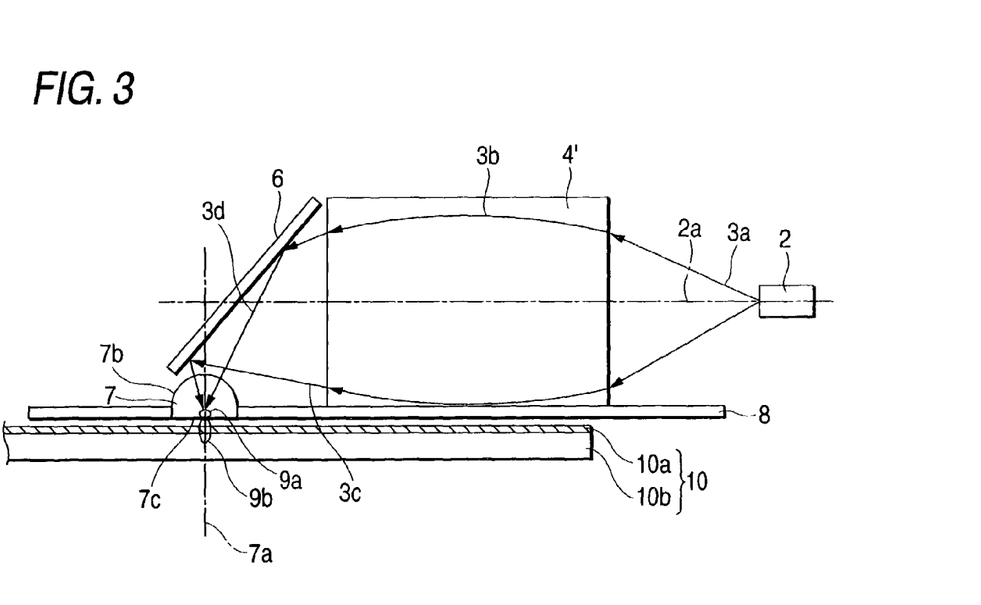
FIG. 3 is a lateral cross sectional view showing an optical head according to a third embodiment of the invention.

FIG. 3 shows an important part of a recording system of an optical head according to the third embodiment of the invention. In the optical head according to the third embodiment, a distributed refractive index (GRIN) lens 4' having a refractive index increasing from the periphery toward the center is used instead of the collimator lens 4 and the objective lens 5 used in the first embodiment. Because the end surfaces of the GRIN lens 4' are plane surfaces, the assembling accuracy can be improved in this configuration.

Figure 4:
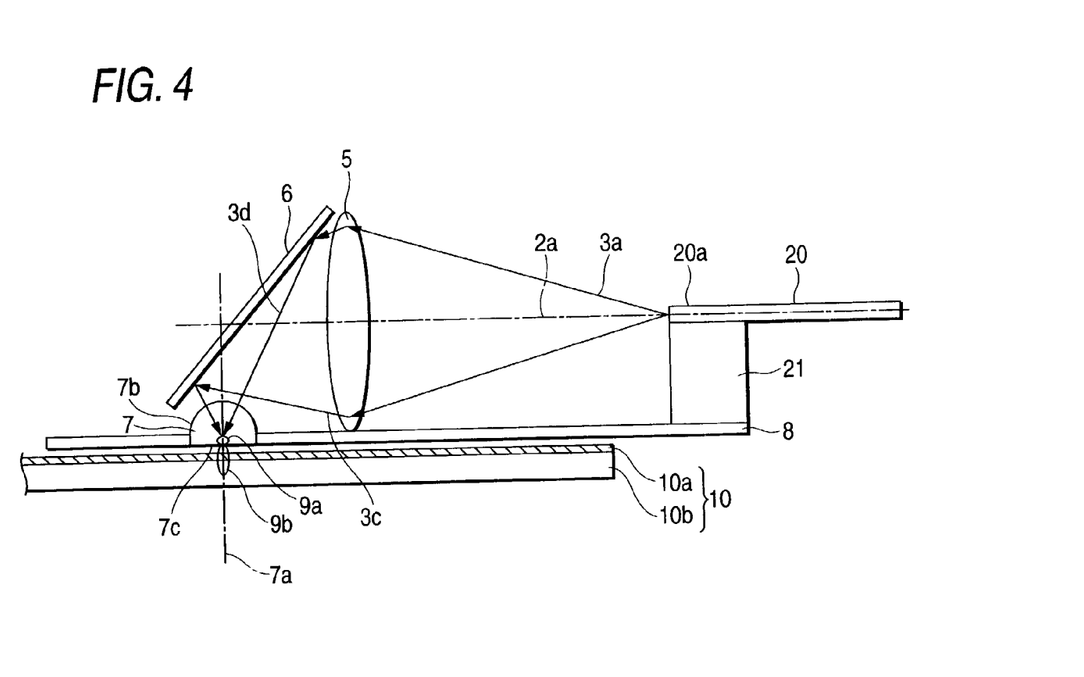
FIG. 4 is a lateral cross sectional view showing a disk unit according to a fourth embodiment of the invention.

FIG. 4 shows an important part of a recording system of an optical head according to the fourth embodiment of the invention. In the optical head according to the fourth embodiment, an optical fiber 20 is arranged as the emitting source of the laser light 3a instead of the semiconductor laser 2, and the laser light 3a emitted from an emitting end surface 20a thereof is used for recording and reproduction. Numeral 21 in the figure denotes a holder for the fiber 20. This embodiment is constituted in the same manner as in the second embodiment except the feature noted herein. According to the fourth embodiment, the emitting end surface 20a of the optical fiber 20 for propagating and emitting laser light from a semiconductor laser not shown in the figure is integrated on the flying slider 8, whereby a mechanical servo system for automatic focusing can be omitted to realize small size and lightweight.

The semiconductor laser (not shown in the figure) inputting laser light to the optical fiber 20 may be provided on a fixing part (not shown in the figure) of the optical disk unit or on a swing arm (not shown in the figure) for scanning the optical head 1. According to the configuration, the weight of the optical head 1 can be reduced, and heating of the optical head 1 by heat generation of the semiconductor laser and influence of heat distortion caused thereby can be avoided, whereby stable recording and reproduction can be carried out with high reliability.

Figure 5:
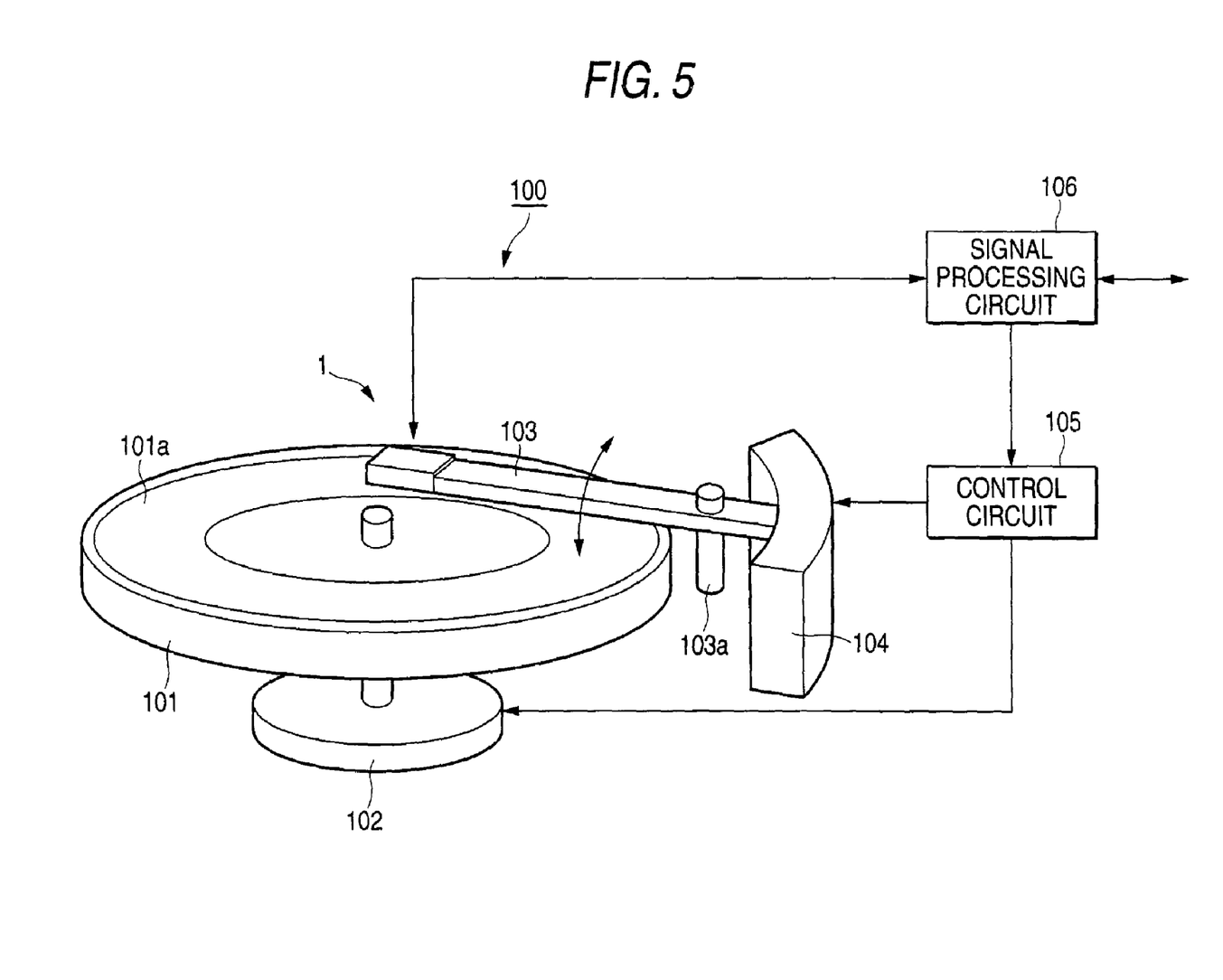
FIG. 5 is a lateral cross sectional view showing a disk unit according to a fifth embodiment of the invention.

FIG. 5 shows a disk unit according to the fifth embodiment of the invention. The disk unit 100 according to the fifth embodiment has an optical disk 101 using a phase change recording medium as a recording film 101a, a motor 102 for rotating the optical disk 101, an optical head 1 for carrying out recording and reproduction on the recording film 101a through running in a flying state above the recording film 101a, a swing arm 103 for swinging the optical head 1 with a supporting axis 103a as a center, a voice coil motor 104 for driving the swing arm 103, a signal processing circuit 105 for processing recording signals and modulating the laser light of the optical head 1 upon recording, or reproducing recorded signals by using light intensity signals from the optical head 1 upon reproduction, and a control circuit 106 for controlling the motor 102 and the voice coil motor 104 upon recording and reproduction.

Figure 6:
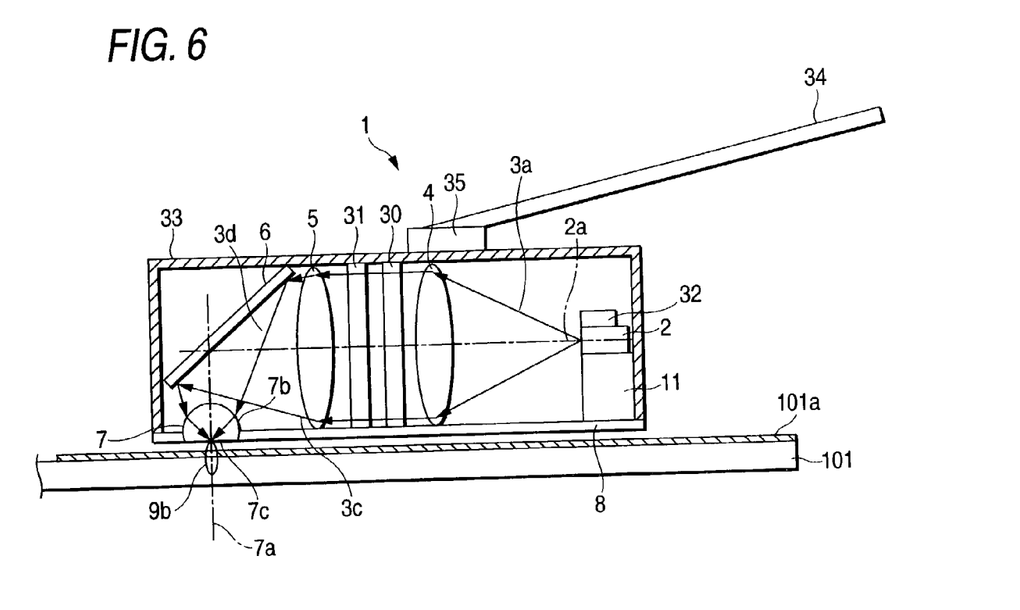
FIG. 6 is a lateral cross sectional view showing an optical head used in the disk unit according to the fifth embodiment of the invention.

FIG. 6 shows the optical head 1 according to the fifth embodiment. The optical head 1 is constituted with the recording system, the optical system for reproduction and the supporting system therefor used in the first embodiment. That is, the optical head 1 has a semiconductor laser 2 of a beam spot scanning type, a collimator lens 4 for collimating output light 3a from the semiconductor laser 2, a polarizing beam splitter 30, which is an optical system for separating incident light and reflected light, a ¼ wavelength plate 31, an objective lens 5 for converging a parallel beam 3b, a folding mirror for reflecting converging light 3c from the objective lens 5 at a right angle, a super semispherical solid immersion lens 7 (S-SIL), a flying slider 8, a photodetector 32 for receiving reflected signal light and converting it to electric signals, a case 33, a suspender 34 for connecting the case 33 to the swing arm 103 shown in FIG. 5, and a supporting member 35 for supporting the case 33 on the suspender 34.

According to the configuration, upon recording, the laser light 3a having been subjected to intensity modulation based on the signal input emitted from the semiconductor laser 2 is converged at a vicinity of the converging surface 7c of the S-SIL 7, and is incident on the recording film 101a arranged immediately thereunder to record the information on the recording film 101a. Upon reproduction, the recording film 101a is irradiated with weak laser light emitted from the semiconductor laser 2 that does not apply any influence on the records of the recording film 101a. The reflected light therefrom becomes linear polarized light having a polarizing plane rotated by 90° with respect to the incident light by passing through the ¼ wavelength plate 31, and it is separated from the light path of the incident light with the polarizing beam splitter 30 to be incident on the photodetector 32 for reproduction as information signals. Upon recording and reproduction, it is necessary that the light emitted from the optical head 1 is moved to a specific recording track (not shown in the figure) on the recording film 101a and then tracks the recording track. These operations are carried out by driving of the voice coil motor 104 and two-step positional control on scanning the emitting position of the semiconductor laser 2 of a beam spot scanning type. That is, the address information of the optical disk 101 is read, and the voice coil motor 104 is driven by driving signals formed based on the information to move the optical head 1 to the vicinity of the specific track. Thereafter, the optical head 1 is made to track the specific track precisely by driving of the voice coil motor 104 and the semiconductor laser 2 of a beam spot scanning type.

According to the fifth embodiment, the optical head 1 having small size and lightweight can be used for recording and reproduction of an optical disk, and thus a disk unit of high-speed recording and reproduction and high density, particularly high volume recording density, can be provided.

It is also possible that a galvanometer mirror capable of carrying out angular scanning is used as the folding mirror 6 instead of the driving of the semiconductor laser 2, and precise tracking is carried out by driving the galvanometer mirror. Furthermore, owing to the small size and lightweight of the optical head 1 itself, it is possible that the entire optical head 1 is driven by a piezoelectric element (not shown in the figure) to effect precise tracking.

In the case where a galvanometer mirror or a piezoelectric element is used for driving, the optical fiber 20 used in the fourth embodiment may be used instead of the semiconductor laser 2. It is possible that the optical fiber 20 is assembled on the flying slider 8 through a piezoelectric element (not shown in the figure), whereby the laser light emitting end surface 20a of the optical fiber 20 is driven by the piezoelectric element to effect precise tracking. By using such a constitution that the laser light emitting end surface 20a of the semiconductor laser 2 or the optical fiber 20 is horizontally scanned, or such a constitution that the angle of the laser light from the objective lens 5 is horizontally scanned with a galvanometer mirror, the size the beam scanning mechanism for tracking can be reduced to realize small size and lightweight of the optical head.

Furthermore, the phase change medium is used as the recording film 101a of the disk 101 in this embodiment, and an optical system for reproducing magneto-optical signals is assembled on the optical head 1 to enable recording and reproduction of a magneto-optical disk using a magneto-optical medium as a recording film. Moreover, a magnetic medium is used, and a magnetic resistive sensor and a magnetic coil are assembled on the optical head 1, whereby optically assisted magnetic recording and reproduction of a magnetic disk can be carried out.

In the case where a folding mirror 6 is arranged between the objective lens 5 and the SIL or S-SIL 7, it is necessary that they do not interfere with each other, and they are arranged to converge laser light at the bottom surface of the SIL 7. Simultaneously, the bottom surface of the SIL (or S-SIL) is positioned under the edges of the objective lens 5 and the collimator lens 4 (i.e., on the side of the recording medium), and the condition of NA>1 is satisfied, whereby the height of the head can be reduced, and the recording medium can be approached to the bottom surface of the SL or the S-SIL. As a result, the recording medium can be effectively irradiated with the near-field light.

Specifically, in the semispherical SIL, the refractive index n of the SIL is preferably requested by the following equation, which comes from the condition that the length of the light path from the center of the objective lens 5 to the center of the bottom surface of the SIL L must be longer than the focal length of the objective lens Lo.

$n > 1/\sin(\cot^{-1}(1/2)) = \sqrt{3}$

In the S-SIL, it is preferably requested by the following equation, where the radius of the bottom surface of the S-SIL 7 is represented by r, and the radius of the objective lens 5 is represented by D.

$r/D < (n/(n^2-1)) \cdot (\cot^{-1}(\sin^{-1}(1/n))-1)$

As described in the foregoing, according to the embodiment, the optical axis of the objective lens is arranged to form a right angle with respect to the optical axis of the solid immersion lens, whereby the height of the head can be reduced, and thus a disk of high recording density and large capacity can be realized.

Figure 7A:
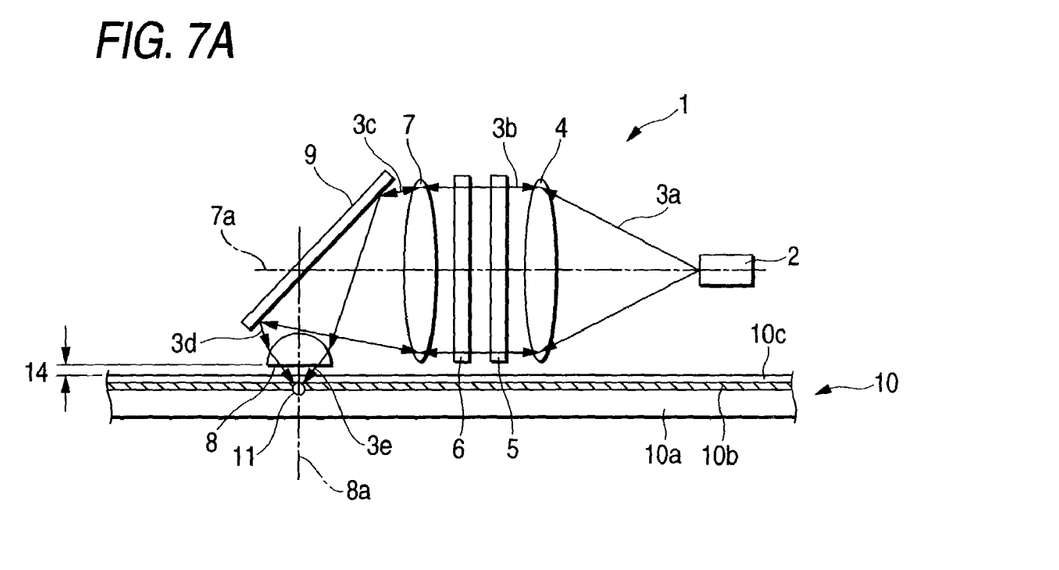
FIG. 7A is a lateral cross sectional view thereof.
Figure 7B:
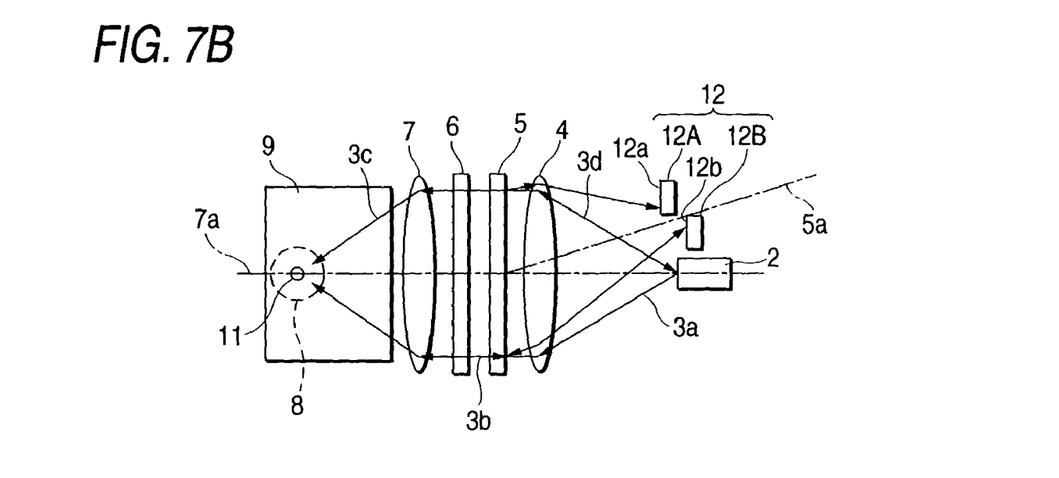
FIG. 7B is a bottom plane view thereof.

FIGS. 7A and 7B show an important part of an optical head according to a sixth embodiment of the invention, in which FIG. 7A is a lateral cross sectional view, and FIG. 7B is a bottom plane view. The optical head 1 has a semiconductor laser 2 as a laser light emitting optical element emitting laser light 3a, a collimator lens 4 shaping the output light 3a from the semiconductor laser 2 into parallel light 3b, a polarizing beam splitter 5 for separating reflected light from a recording layer 10b of an optical disk 10 from the light path of the incident light 3b, a 2-group lenses containing an objective lens 7 as a first lens, on which the parallel light 3b from the collimator lens 4 is incident through the polarizing beam splitter 5 and a ¼ wavelength plate 6, and a second objective lens 8 as a second lens arranged to face the recording layer 10b of the optical disk 10, the 2-group lenses for converging the parallel light 3b from the collimator lens 4 on the recording layer 10b, a folding mirror 9 as a reflector for returning the laser light 3c from the first lens 7 to be incident on the second lens 8, and a photodetector 12 for detecting reflected light from the recording layer 10b through the polarizing beam splitter 5 and the ¼ wavelength plate 6.

An interference type polarizing beam splitter 5 is used for size reduction, and the reflected light having a polarizing plane different from the incident light by 90° is separated from the light path of the incident light 3b by going to and returning from the ¼ wavelength plate 6 to be incident on the photodetector 12, whereby signal reproduction is carried out, and error signals for focal point controlling and tracking are produced.

As the second objective lens 8, for example, a solid immersion lens (semispherical lens) can be used.

The photodetector 12 is constituted with a first detector 12A and a second detector 12B as shown in FIG. 7B, and the respective detecting surfaces 12a and 12b are arranged on both sides of the optical axis 5a of the reflected light with a prescribed distance therebetween in the direction of the optical axis. The positions of the detecting surfaces 12a and 12b are arranged, for example, with a distance of 20 μm in the direction of the optical axis with respect to the center, which is the position where the light path length of the reflected light becomes the same as the light path length to the emitting surface of the semiconductor laser 2. The photodetector 12 can be produced monolithically in such a manner that portions of an Si substrate corresponding to the detecting surfaces 12a and 12b are etched to a prescribed thickness, and a pin junction is formed. In alternative, the detecting surfaces 12a and 12b are discreetly formed and then assembled.

Figure 8A:
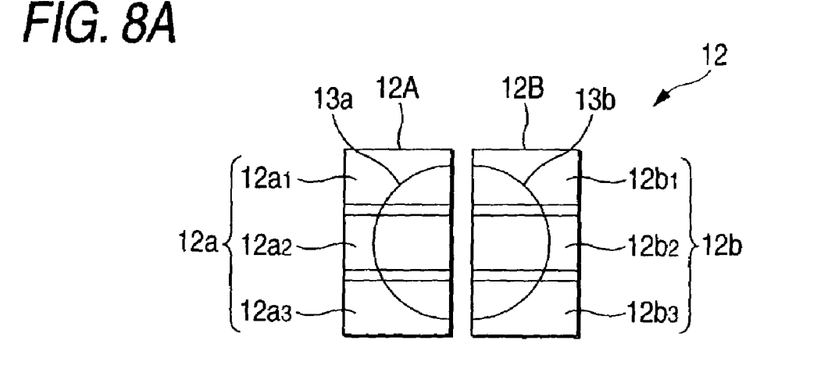
FIGS. 8A to 8C are diagrams showing detecting surfaces of photodetectors according to the sixth embodiment of the invention.
Figure 8B:
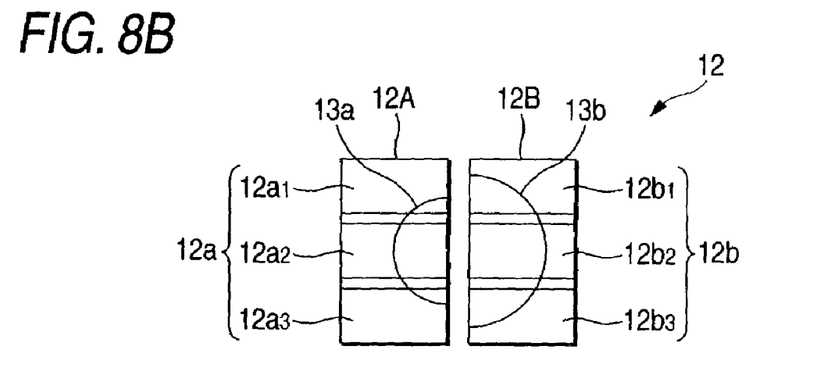
Figure 8C:
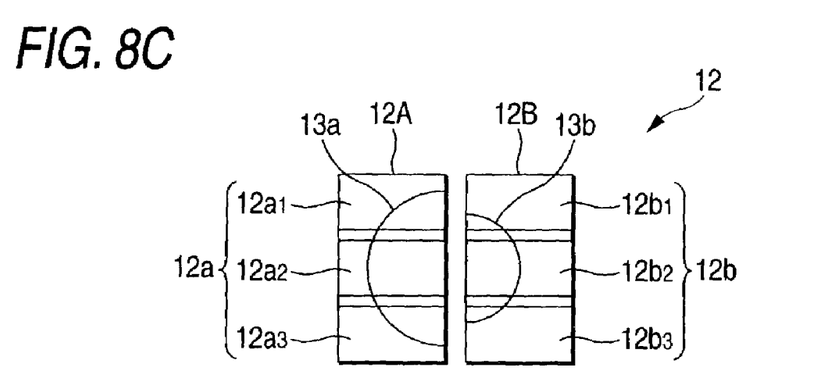

FIGS. 8A to 8C show detecting surfaces of the photodetectors 12. The detecting surfaces 12a and 12b of the first and second detectors 12A and 12B each is divided into three parts in the direction perpendicular to the recording layer 10b. The detecting surface 12a of the first detector 12A contains three detecting regions $12a_1$, $12a_2$ and $12a_3$, and the detecting surface 12b of the second detector 12B contains three detecting regions $12b_1$, $12b_2$ and $12b_3$.

In the optical head 1 thus constituted, the laser light 3a emitted from the semiconductor laser 2 in a direction substantially parallel to the recording layer 10b of the optical disk 10 is shaped into the parallel light 3b with the collimator lens 4, shaped into the converging light 3c with the objective lens 5, and then reflected by the folding mirror 9 to be incident on the second objective lens 8, whereby the light is converged at the recording layer 10b through a protective layer 10c. Recording is performed on the recording layer 10b with the light spot 11 formed by converging the light on the recording layer 10b. Upon reproduction, the reflected light from the recording layer 10b tracks back the path of the incident light 3b, 3c, 3d and 3e, and after separating from the incident light 3b with the polarizing beam splitter 5, it is incident on the photodetector 12 to be used for signal reproduction.

In the case of just focus, as shown in FIG. 8A, the diameters of the light spots 13a and 13b on the detecting surfaces 12a and 12b are the same as each other. In the case where the recording layer 10b is deviated from the focal point in the direction of the optical axis 8a of the objective lens 8, as shown in FIGS. 8B and 8C, the diameters of the light spots 13a and 13b on the detecting surfaces 12a and 12b are enlarged or shrunk. The fluctuation of the diameters of the light spots 13a and 13b is detected as the change in light amount incident on the three separated detecting regions $12a_1$ to $12a_3$ and $12b_1$ to $12b_3$ to form a focal point error signal (IFES). The operational expression can be provided by the following equation, where the light intensities on the detecting regions $12a_1$ to $12a_3$ and $12b_1$ to $12b_3$ are represented by $Ia_1$ to $Ia_3$ and $Ib_1$ to $Ib_3$, respectively.

$$IFES = (Ia_1 + Ia_3 - Ia_2) - (Ib_1 + Ib_3 - Ib_2)$$

A tracking error signal (ITES) is given by the following equation as a difference between the detecting surfaces 12a and 12b by using the push-pull method as similar to the case of a DVD-RAM.

$$ITES = (Ia_1 + Ia_3 + Ia_2) - (Ib_1 + Ib_3 + Ib_2)$$

The recording signals are given as the sum of the light intensities of all the detecting regions $12a_1$ to $12a_3$ and $12b_1$ to $12b_3$.

According to the sixth embodiment, the optical axis 7a of the objective lens 7 is arranged in parallel to the recording layer 10b, and therefore, the height of the optical head 1 can be substantially reduced to the level equivalent to the diameter of the objective lens 7.

Furthermore, owing to the use of the 2-group lenses containing the objective lens 7 and the second objective lens 8, the numerical aperture of 0.85 can be attained, which is substantially equal to a DVR.

Specifically, an average distance 14 between the second objective lens 8 and the protective layer 10c is 20 $\mu$m, and the emitted light from the second objective lens 8 is con-verged on the recording layer 10b through the protective layer 10c having a thickness of 100 $\mu$m. Therefore, the diameter of the second objective lens 8 can be reduced to 0.5 mm with a certain margin to enable weight saving. Furthermore, in the case where the diameter and the numerical aperture of the objective lens 7 are 1.5 mm and 0.4, respectively, all the optical elements from the semiconductor laser 2 to the folding mirror 9 can be mounted on the same Si substrate (not shown in the figure) having a thickness of 0.3 mm, and therefore, in the case where the Si substrate is provided on the side surface of the optical head 1 to support the optical elements, the total height of the optical head can be 2 mm or less although such a high numerical aperture of 0.85 is attained, which is Far larger than that of the optical head used for conventional DVD drive.

Furthermore, an error signal forming mechanism of small size and lightweight can be established owing to the use of the two-separated photodetector having the positions of the detecting surfaces 12a and 12b of the photodetector 12 deviated from each other. Therefore, in the case where the optical head is used in a disk unit, the total height of the unit can be reduced.

The objective lens 7 and the collimator lens 4 may be a distributed refractive index (GRIN) lens having a refractive index increasing from the periphery toward the center, a hologram lens or a Fresnel lens. Because the end surfaces of the GRIN lens are plane surfaces, the assembling accuracy can be improved thereby. Furthermore, the objective lens 7 and the collimator lens 4 can be formed as a unit. According to the configuration, the assembling accuracy can be further improved, and the assembling cost can also be reduced. A prism may be used as the reflector instead of the folding mirror 9.

Figure 9:
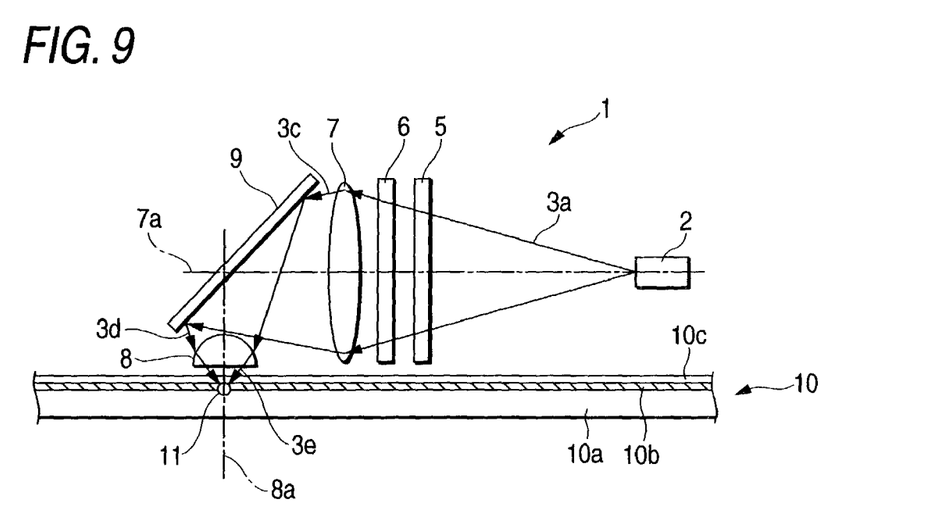
FIG. 9 is a lateral cross sectional view showing an optical head according to a seventh embodiment of the invention.

FIG. 9 shows an optical head according to the seventh embodiment of the invention. The optical head 1 is obtained by omitting the collimator lens from the sixth embodiment. According to the embodiment, the number of parts contained in the optical system can be reduced to enable low cost. In this case, in order to prevent reduction of the NA on the converging side of the objective lens 7, the broadening angle of the beam emitted from the semiconductor laser 2 cannot be so large. Therefore, a vertical-cavity surface emitting laser (VCSEL) exhibiting a small beam broadening angle of about 8° is preferably used as the semiconductor laser 2.

Figure 10:
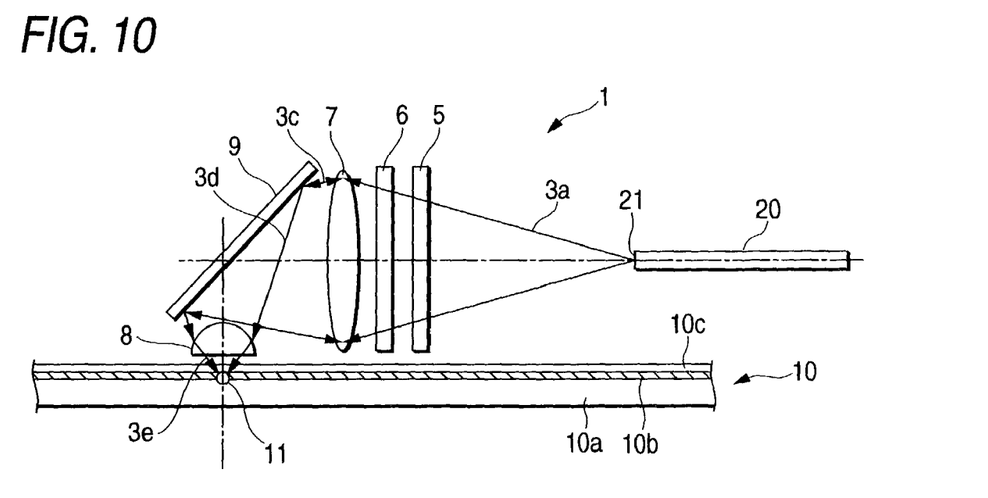
FIG. 10 is a lateral cross sectional view showing an optical head according to a eighth embodiment of the invention.

FIG. 10 shows an optical head according to the eighth embodiment of the invention. In this optical head 1, the laser light emitted from the semiconductor laser in the seventh embodiment is emitted through an optical fiber 20 as the laser light emitting optical element. Because output light from an emitting surface 21 of the optical fiber 20 is of circular conic shape with a small broadening angle, it is suitable for systems using no collimator lens.

The semiconductor laser may be provided on a swing arm (not shown in the figure) for scanning the optical head 1 on the optical disk 10, or provided on a suspender (not shown in the figure) for attaching the optical head 1 to the swing arm. According to the arrangement, the weight of the optical head 1 can be reduced, and the optical head 1 can be prevented from receiving influence of heat generation of the semiconductor laser 2, whereby thermally stable recording and reproduction can be carried out with high reliability.

Figure 11:
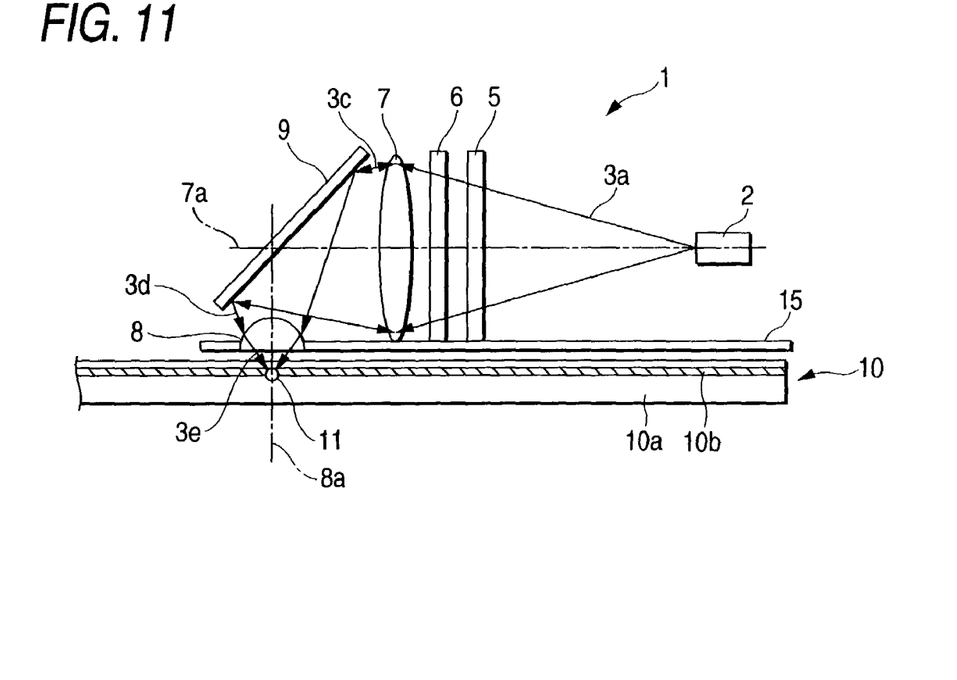
FIG. 11 is a lateral cross sectional view showing an optical head according to a ninth embodiment of the invention.

FIG. 11 shows an optical head according to the ninth embodiment of the invention. In the optical head 1, the entire optical system containing the semiconductor laser 2, the collimator lens 4, the polarizing beam splitter 5, the ¼ wavelength plate 6, the objective lens 7, the second objective lens 8 and the folding mirror 9 is arranged on a flying slider 15, which runs in a flying state above the optical disk 10. According to the ninth embodiment, the flying height is stabilized, and thus the extent in out-of-focus can be reduced. The focal control can be carried out by controlling a part of the optical system, whereby the weight of the focal controlling mechanism can be reduced, and the weight of the optical head can be reduced. In the case where an optical fiber is used as the laser light emitting optical element as shown in FIG. 4, it is possible that tracking is carried out by scanning the emitting end surface of the optical fiber with a piezoelectric element. Furthermore, the flying slider 15 may run in a flying state with such a distance between the objective lens 8 and the surface of the recording layer 10*b* that forms an evanescent coupling. According to the configuration, the light intensity of the light spot 11 can be increased.

As a disk unit according to a tenth embodiment of the invention, the same constitution as in the fifth embodiment can be employed. According to the tenth embodiment, the optical head 1 having small size and lightweight can be used for recording and reproduction of an optical disk 31, and thus a disk unit of high speed recording and reproduction and high density, particularly high volume recording density, can be provided.

It is also possible that a galvanometer mirror capable of carrying out angular scanning is used as the folding mirror 9, and precise tracking is carried out by driving the galvanometer mirror instead of the driving of the semiconductor laser 2. Furthermore, owing to the small size and lightweight of the optical head 1 itself, it is possible that the entire optical head 1 is driven by a piezoelectric element (not shown in the figure) to effect precise tracking. In the case where a galvanometer mirror or a piezoelectric element is used for driving, it goes without saying that the optical fiber 20 used in the embodiments may be used instead of the semiconductor laser 2. It is possible that the optical fiber 20 is assembled on the optical head 1 through a piezoelectric element (not shown in the figure), whereby precise tracking is carried out with the piezoelectric element. While the phase change medium is used as the recording film 31*a* of the disk 31 in this embodiment, an optical system for reproducing magneto-optical signals is assembled on the optical head 1 to enable recording and reproduction of a magneto-optical disk using a magneto-optical medium as a recording film. Furthermore, a magnetic medium is used, and a magneto-resistive sensor and a magnetic coil are assembled on the optical head 1, whereby optically assisted magnetic recording and reproduction of a magnetic disk can be carried out. Moreover, the recording layer may have a multilayer structure, and according to the configuration, the recording density can be further increased.

According to the invention as described in the foregoing, the height of the optical disk can be reduced. Therefore, by using the optical head in a disk unit, the disk unit can attain small size and high recording density.

The entire disclosure of Japanese Patent Application No. 2001-318447 filed on Oct. 16, 2001 including specification, claims, drawings and abstract is incorporated herein by reference in its entirety.

What is claimed is:

1. An optical head comprising:
   a laser light emitting optical element emitting laser light;
   an optical system converging the incident laser light, the optical system comprising a first lens for converging the laser light with an optical axis of the first lens being arranged in parallel to a recording layer of a recording medium, and a second lens, to which the laser light converged by the first lens is incident, facing the recording layer with an optical axis of the second lens being arranged in substantially perpendicular to the recording layer; and
   a reflector positioned between the first lens and the second lens, the reflector reflecting the laser light being converged by the first lens to be incident on the second lens.

2. An optical head forming a light spot on an emission surface of a solid immersion lens or a vicinity thereof, the optical head comprising:
   a light converging optical system comprising an objective lens that converges laser light emitted from a semiconductor laser, and a folding mirror between the objective lens and the solid immersion lens, the folding mirror reflecting the laser light being converged by the objective lens to a side of the solid immersion lens, an optical axis of the objective lens being arranged in perpendicular to an optical axis of the solid immersion lens.

3. The optical head as claimed in claim 2, wherein the folding mirror has a flat reflective surface.

4. The optical head as claimed in claim 2, wherein the light converging optical system further comprises a collimator lens between the semiconductor laser and the objective lens, and the collimator lens shapes the laser light emitted from the semiconductor laser into parallel light.

5. The optical head as claimed in claim 4, wherein the objective lens and the collimator lens are formed as a unit.

6. The optical head as claimed in claim 2, wherein the objective lens is arranged to make the laser light directly incident thereon, which is emitted from the semiconductor laser with a prescribed broadening angle.

7. The optical head as claimed in claim 2, wherein the objective lens comprises a distributed refractive index lens having a refractive index increasing from a periphery toward a center.

8. The optical head as claimed in claim 2, wherein the solid immersion lens is formed with a part of spherical surface and has a semispherical form comprising an incident surface, on which the laser light is incident, and the emission surface comprising a plane surface including a center of the spherical surface.

9. The optical head as claimed in claim 2, wherein the solid immersion lens is formed with a part of spherical surface and has a super semispherical form comprising an incident surface, on which the laser light is incident, and the emission surface comprising a plane surface that is perpendicular to a light axis of an incident surface and is arranged at a position remote from a center of the spherical surface to a side opposite to the incident surface to a prescribed distance.

10. The optical head as claimed in claim 2, wherein the objective lens, the folding mirror and the solid immersion lens are arranged on a flying slider.

11. The optical head as claimed in claim 10, wherein the semiconductor laser is arranged on the flying slider.

12. The optical head as claimed in claim 2, wherein an optical axis of emitting light from the semiconductor laser is conformed to an optical axis of the objective lens.

13. The optical head as claimed in claim 1, wherein the semiconductor laser is a horizontal radiation semiconductor laser oscillating in a direction in parallel to an active layer or a vertical radiation semiconductor laser oscillating in a direction perpendicular to the active layer.

14. The optical head as claimed in claim 1, wherein the semiconductor laser emits the laser light through an optical fiber having an optical axis at an emitting end surface conforming to an optical axis of the objective lens.

15. The optical head as claimed in claim 2, wherein the solid immersion lens has a metallic body at a position of the light spot on the emission surface or a vicinity thereof, the metallic body has at least one edge having a length smaller than a size of the light spot.

16. The optical head as claimed in claim 2, wherein the solid immersion lens has plural metallic bodies at a position of the light spot on the emission surface or a vicinity thereof, the plural metallic bodies are arranged with a distance smaller than a size of the light spot.

17. An optical head forming a light spot on an emission surface of a solid immersion lens or a vicinity thereof, the optical head comprising
  a light converging optical system containing an objective lens that converges laser light emitted from a semiconductor laser, and a folding mirror between the objective lens and the solid immersion lens, the folding mirror reflecting the laser light being converged by the objective lens to a side of the solid immersion lens, an optical axis of the objective lens being arranged in perpendicular to an optical axis of the solid immersion lens; and
  a scanning unit for scanning the light spot in a direction perpendicular to the optical axis of the objective lens and the optical axis of the solid immersion lens.

18. The optical head as claimed in claim 17, wherein the scanning unit is a beam scanning semiconductor laser used as the semiconductor laser.

19. The optical head as claimed in claim 17, wherein
  the semiconductor laser emits the laser light through an optical fiber, and
  the scanning unit comprises a piezoelectric element moving an emitting end surface of the laser light of the optical fiber in a direction perpendicular to the optical axis of the objective lens and the optical axis of the solid immersion lens.

20. The optical head as claimed in claim 17, wherein
  the scanning unit is a galvanometer mirror scanning the laser light from the objective lens, which is used as the folding mirror.

21. A disk unit comprising:
  an optical head forming a light spot on an emission surface of a solid immersion lens or a vicinity thereof, the optical head comprising a light converging optical system containing an objective lens that converges laser light emitted from a semiconductor laser, and a folding mirror between the objective lens and the solid immersion lens, the folding mirror reflecting the laser light being converged by the objective lens to a side of the solid immersion lens;
  a rotating information recording disk;
  a running unit for running the optical head in a flying state above the information recording disk; and
  a reproducing unit for reproducing information signals from the information recording disk by irradiating the information recording disk with the light spot,
  an optical axis of the objective lens being arranged in perpendicular to an optical axis of the solid immersion lens.

22. The disk unit as claimed in claim 21, wherein the information recording disk comprises an optical disk or a magneto-optical disk reproducing the information signals with the laser light.

23. The disk unit as claimed in claim 21, wherein the information recording disk comprises a magnetic disk for reproducing the information signals with a magneto-resistive sensor.

24. An optical head comprising:
  a laser light emitting optical element for emitting laser light,
  2-group lenses comprising a first lens arranged on a side of the laser light emitting optical element and a second lens arranged to face a recording layer, the 2-group lenses converging the laser light emitted from the laser light emitting optical element,
  a photodetector for detecting reflected light from the recording layer, and
  a moving unit for moving a converging point of the laser light on the recording layer,
  an optical axis of the first lens being arranged in substantially parallel to the recording layer, and the laser light emitted from the laser light emitting optical element and converged by the 2-group lenses being reflected by a reflector to be incident on the second lens.

25. The optical head as claimed in claim 24, wherein the 2-group lenses have a numerical aperture of 0.6 or more.

26. The optical head as claimed in claim 24, wherein
  the reflector comprises a galvanometer mirror, and
  the moving unit drives the galvanometer mirror to polarize light emitted from the first lens to scan the converging point of the laser light.

27. The optical head as claimed in claim 24, wherein the moving unit carries out focal point control by moving the first lens along an optical axis thereof.

28. The optical head as claimed in claim 24, wherein the moving unit carries out focal point control by moving the second lens along an optical axis thereof.

29. The optical head as claimed in claim 24, wherein the laser light emitting optical element is a semiconductor laser.

30. The optical head as claimed in claim 24, wherein the laser light emitting optical element is a beam scanning semiconductor laser capable of scanning an emitting position of the laser light in a horizontal direction in parallel to the recording layer.

31. The optical head as claimed in claim 30, wherein the laser light emitting optical element comprises an optical fiber introducing and emitting the laser light emitted from the semiconductor laser.

32. The optical head as claimed in claim 31, wherein the moving unit is a piezoelectric element scanning the optical fiber in a direction in parallel to the recording layer.

33. The optical head as claimed in claim 24, wherein the laser light emitted from the laser light emitting optical element is shaped into parallel light with a collimator lens to be incident on the first lens.

34. The optical head as claimed in claim 24, wherein the first lens is one of a distributed refractive index lens having a refractive index increasing from a periphery toward a center, a hologram lens and a Fresnel lens.

35. The optical head as claimed in claim 33, wherein the collimator lens is one of a distributed refractive index lens having a refractive index increasing from a periphery toward a center, a hologram lens and a Fresnel lens.

36. The optical head as claimed in claim 33, wherein the first lens and the collimator lens are formed as a unit to converge scattering light from the laser light emitting optical element to be incident on the second lens.

37. The optical head as claimed in claim 24, wherein the photodetector comprises a first detecting surface and a second detecting surface arranged at different positions on an optical axis of the reflected light from the recording layer, and the first and second detecting surfaces each has three detecting regions divided into three in a direction perpendicular to the optical axis of the reflected light.

38. The optical head as claimed in claim 37, wherein the first detecting surface and the second detecting surface are arranged to make a dividing line dividing them being perpendicular to a plane formed by optical axes of emitting light and the reflected light of the laser light, and the first and second detecting surfaces are arranged at different positions on the optical axis of the reflected light with respect to a center, which is a position where a light path length of the reflected light becomes the same as a light path length to the emitting surface of the laser light emitting optical element.

39. The optical head as claimed in claim 24, wherein the laser light emitting optical element, the 2-group lenses and the photodetector are arranged on a flying slider running in a flying state above a surface of the recording layer.

40. The optical head as claimed in claim 39, wherein the flying slider runs in a flying state with such a distance between the second lens and the surface of the recording layer that forms an evanescent coupling.

41. A disk unit recording and reproducing information by emitting laser light from an optical head to be incident on the rotating disk, the optical head comprising a laser light emitting optical element emitting laser light, and 2-group lenses containing a first lens arranged on a side of the laser light emitting optical element and a second lens arranged to face a recording layer, the 2-group lenses converging the laser light emitted from the laser light emitting optical element, an optical axis of the first lens being arranged in substantially parallel to the recording layer, and the laser light emitted from the laser light emitting optical element and converged by the 2-group lenses being reflected by a reflector to be incident on the second lens.

42. A disk unit as claimed in claim 41, wherein the recording layer of the disk has a multilayer structure.

43. A disk unit as claimed in claim 41, wherein the laser light emitting optical element is an optical fiber introducing and emitting the laser light emitted from a semiconductor laser, and the semiconductor laser is arranged on a swing arm for scanning the optical head or on a suspender for attaching the optical head to the swing arm.

* * * * *